(12) United States Patent
Mirichigni et al.

(10) Patent No.: US 10,860,482 B2
(45) Date of Patent: *Dec. 8, 2020

(54) APPARATUSES AND METHODS FOR PROVIDING DATA TO A CONFIGURABLE STORAGE AREA

(71) Applicant: MICRON TECHNOLOGY, INC., Boise, ID (US)

(72) Inventors: Graziano Mirichigni, Vimercate (IT); Luca Porzio, Volla (IT); Erminio Di Martino, Quarto (IT); Giacomo Bernardi, Marcianise (IT); Domenico Monteleone, Caserta (IT); Stefano Zanardi, Seriate (IT); Chee Weng Tan, Jurong West (SG); Sebastien LeMarie, Singapore (SG); Andre Klindworth, Neubiberg (DE)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,945

(22) Filed: Feb. 11, 2019

(65) Prior Publication Data

US 2019/0171567 A1    Jun. 6, 2019

Related U.S. Application Data

(63) Continuation of application No. 15/857,435, filed on Dec. 28, 2017, now Pat. No. 10,223,263, which is a (Continued)

(51) Int. Cl.
*G06F 12/0804* (2016.01)
*G06F 12/0891* (2016.01)
(Continued)

(52) U.S. Cl.
CPC ...... *G06F 12/0804* (2013.01); *G06F 12/0891* (2013.01); *G06F 13/00* (2013.01);
(Continued)

(58) Field of Classification Search
CPC .................................................. G06F 12/0891
See application file for complete search history.

(56) References Cited

U.S. PATENT DOCUMENTS

| 4,833,642 A | 5/1989 | Ooi |
| 5,287,469 A | 2/1994 | Tsuboi |

(Continued)

FOREIGN PATENT DOCUMENTS

| CN | 1497604 A | 5/2004 |
| CN | 1751360 A | 3/2006 |

(Continued)

OTHER PUBLICATIONS

U.S. Appl. No. 15/637,961, entitled "Apparatuses and Methods for Providing Data to a Configurable Storage Area", filed Jun. 29, 2017, pp. all.

(Continued)

*Primary Examiner* — William E. Baughman
(74) *Attorney, Agent, or Firm* — Dorsey & Whitney LLP

(57) ABSTRACT

Apparatuses and methods for providing data to a configurable storage area are described herein. An example apparatus may include an extended address register including a plurality of configuration bits indicative of an offset and a size, an array having a storage area, a size and offset of the storage area based, at least in part, on the plurality of configuration bits, and a buffer configured to store data, the data including data intended to be stored in the storage area. A memory control unit may be coupled to the buffer and configured to cause the buffer to store the data intended to (Continued)

be stored in the storage area in the storage area of the array responsive, at least in part, to a flush command.

16 Claims, 6 Drawing Sheets

Related U.S. Application Data continuation of application No. 15/637,961, filed on Jun. 29, 2017, now Pat. No. 9,928,171, which is a continuation of application No. 13/967,206, filed on Aug. 14, 2013, now Pat. No. 9,727,493.

(51) Int. Cl.
  *G06F 13/16* (2006.01)
  *G06F 13/00* (2006.01)
(52) U.S. Cl.
  CPC ...... *G06F 13/1673* (2013.01); *G06F 13/1694* (2013.01); *G06F 2212/1024* (2013.01)

(56) References Cited

U.S. PATENT DOCUMENTS

| | | |
|---|---|---|
| 5,369,616 A | 11/1994 | Wells et al. |
| 5,546,344 A | 8/1996 | Fawcett |
| 5,668,972 A | 9/1997 | Liu et al. |
| 5,778,432 A | 7/1998 | Rubin et al. |
| 5,822,244 A | 10/1998 | Hansen et al. |
| 5,892,961 A | 4/1999 | Trimberger |
| 5,893,149 A | 4/1999 | Hagersten et al. |
| 5,953,522 A | 9/1999 | Fox et al. |
| 6,026,034 A | 2/2000 | Suzuki et al. |
| 6,201,739 B1 | 3/2001 | Brown et al. |
| 6,219,384 B1 | 4/2001 | Kliza et al. |
| 6,260,128 B1 | 7/2001 | Ohshima et al. |
| 6,275,077 B1 | 8/2001 | Tobin et al. |
| 6,412,045 B1 | 6/2002 | DeKoning et al. |
| 6,438,055 B1 | 8/2002 | Taguchi et al. |
| 6,459,313 B1 | 10/2002 | Godbee et al. |
| 6,460,114 B1 * | 10/2002 | Jeddeloh .............. G06F 12/084 |
| | | 711/120 |
| 6,510,095 B1 | 1/2003 | Matsuzaki et al. |
| 6,546,462 B1 | 4/2003 | Palanca et al. |
| 6,552,956 B2 | 4/2003 | Shibata |
| 6,629,224 B1 | 9/2003 | Suzuki et al. |
| 6,687,185 B1 | 2/2004 | Keeth et al. |
| 6,710,726 B2 | 3/2004 | Kim et al. |
| 6,744,285 B2 | 6/2004 | Mangum et al. |
| 6,861,901 B2 | 3/2005 | Prexl et al. |
| 6,879,540 B2 | 4/2005 | Maruyama et al. |
| 6,973,008 B2 | 12/2005 | Krause |
| 6,980,479 B2 | 12/2005 | Park |
| 6,988,218 B2 | 1/2006 | Drexler |
| 6,996,016 B2 | 2/2006 | Oh |
| 7,042,799 B2 | 5/2006 | Cho |
| 7,058,799 B2 | 6/2006 | Johnson |
| 7,111,185 B2 | 9/2006 | Gomm et al. |
| 7,139,673 B1 | 11/2006 | Vashi et al. |
| 7,170,819 B2 | 1/2007 | Szczypinski |
| 7,173,863 B2 | 2/2007 | Conley et al. |
| 7,187,599 B2 | 3/2007 | Schnell et al. |
| 7,209,396 B2 | 4/2007 | Schnell |
| 7,219,251 B2 | 5/2007 | Adkisson |
| 7,268,605 B2 | 9/2007 | Fang et al. |
| 7,269,754 B2 | 9/2007 | Ramaswamy et al. |
| 7,280,430 B2 | 10/2007 | Lee |
| 7,340,632 B2 | 3/2008 | Park |
| 7,363,540 B2 | 4/2008 | Patel et al. |
| 7,375,560 B2 | 5/2008 | Lee et al. |
| 7,411,852 B2 | 8/2008 | Nishioka et al. |
| 7,443,216 B2 | 10/2008 | Gomm et al. |
| 7,451,338 B2 | 11/2008 | Lemos |
| 7,463,534 B2 | 12/2008 | Ku et al. |
| 7,509,517 B2 | 3/2009 | Matsumoto et al. |
| 7,579,683 B1 | 8/2009 | Falik et al. |
| 7,590,013 B2 | 9/2009 | Yu et al. |
| 7,593,273 B2 | 9/2009 | Chu et al. |
| 7,609,584 B2 | 10/2009 | Kim et al. |
| 7,616,040 B2 | 11/2009 | Motomura |
| 7,624,209 B1 | 11/2009 | Ansari et al. |
| 7,631,248 B2 | 12/2009 | Zakharchenko et al. |
| 7,643,334 B1 | 1/2010 | Lee et al. |
| 7,656,745 B2 | 2/2010 | Kwak |
| 7,660,187 B2 | 2/2010 | Johnson et al. |
| 7,663,946 B2 | 2/2010 | Kim |
| 7,671,648 B2 | 3/2010 | Kwak |
| 7,715,260 B1 | 5/2010 | Kuo et al. |
| 7,716,510 B2 | 5/2010 | Kwak |
| 7,751,261 B2 | 7/2010 | Cho |
| 7,773,435 B2 | 8/2010 | Cho |
| 7,802,039 B2 | 9/2010 | Morita |
| 7,826,305 B2 | 11/2010 | Fujisawa |
| 7,826,583 B2 | 11/2010 | Jeong et al. |
| 7,865,658 B2 | 1/2011 | Lasser et al. |
| 7,872,924 B2 | 1/2011 | Ma |
| 7,885,365 B2 | 2/2011 | Hagleitner et al. |
| 7,913,103 B2 | 3/2011 | Gold et al. |
| 7,945,800 B2 | 5/2011 | Gomm et al. |
| 7,948,817 B2 | 5/2011 | Coteus et al. |
| 7,969,813 B2 | 6/2011 | Bringivijayaraghavan et al. |
| 7,983,094 B1 | 7/2011 | Roge et al. |
| 8,004,884 B2 | 8/2011 | Franceschini et al. |
| 8,030,981 B2 | 10/2011 | Kim |
| 8,195,891 B2 | 6/2012 | Trika |
| 8,358,546 B2 | 1/2013 | Kim et al. |
| 8,441,888 B2 | 5/2013 | Bringivijayaraghavan et al. |
| 8,489,820 B1 * | 7/2013 | Ellard .............. G06F 12/0246 |
| | | 711/120 |
| 8,509,011 B2 | 8/2013 | Bringivijayaraghavan |
| 8,539,129 B2 | 9/2013 | Wang |
| 8,582,356 B2 | 11/2013 | Abdulla |
| 8,595,441 B1 | 11/2013 | Nakibly et al. |
| 8,902,684 B2 | 12/2014 | Kwean |
| 9,042,156 B2 | 5/2015 | Nakura et al. |
| 9,268,651 B1 * | 2/2016 | Salyers ............... G06F 12/0871 |
| 9,563,565 B2 | 2/2017 | Bernardi et al. |
| 9,710,192 B2 | 7/2017 | Mirichigni et al. |
| 9,727,493 B2 | 8/2017 | Mirichigni et al. |
| 9,734,097 B2 | 8/2017 | Mirichigni et al. |
| 9,740,485 B2 | 8/2017 | Mirichigni et al. |
| 9,754,648 B2 | 9/2017 | Mirichigni et al. |
| 9,928,171 B2 | 3/2018 | Mirichigni et al. |
| 10,067,764 B2 | 9/2018 | Mirichigni et al. |
| 10,067,890 B2 | 9/2018 | Mirichigni et al. |
| 10,163,472 B2 | 12/2018 | Mirichigni et al. |
| 10,223,263 B2 | 3/2019 | Mirichigni et al. |
| 2001/0015924 A1 | 8/2001 | Arimoto et al. |
| 2002/0006074 A1 | 1/2002 | Roohparvar |
| 2002/0168316 A1 | 11/2002 | Shibata |
| 2003/0117864 A1 | 6/2003 | Hampel et al. |
| 2003/0212865 A1 | 11/2003 | Hicken et al. |
| 2004/0098549 A1 | 5/2004 | Dorst |
| 2005/0024107 A1 | 2/2005 | Takai et al. |
| 2005/0068812 A1 | 3/2005 | Oh |
| 2006/0028883 A1 | 2/2006 | Shimoyama |
| 2006/0069812 A1 | 3/2006 | Osborne |
| 2006/0155948 A1 | 7/2006 | Ruckerbauer |
| 2006/0268619 A1 | 11/2006 | Chen |
| 2006/0282717 A1 | 12/2006 | Suda |
| 2007/0005829 A1 | 1/2007 | Fujimoto |
| 2007/0005922 A1 | 1/2007 | Swaminathan et al. |
| 2007/0033427 A1 | 2/2007 | Correale et al. |
| 2007/0088903 A1 | 4/2007 | Choi |
| 2007/0145151 A1 | 6/2007 | Nakamura et al. |
| 2007/0150688 A1 | 6/2007 | Osborne et al. |
| 2007/0156991 A1 | 7/2007 | Gould et al. |
| 2007/0192651 A1 | 8/2007 | Schoch |
| 2007/0217253 A1 | 9/2007 | Kim et al. |
| 2008/0080267 A1 | 4/2008 | Lee |
| 2008/0080271 A1 | 4/2008 | Kim |
| 2008/0082707 A1 | 4/2008 | Gupta et al. |

(56) References Cited

U.S. PATENT DOCUMENTS

| | | | |
|---|---|---|---|
| 2008/0082769 A1* | 4/2008 | Bouchou | G06F 3/061 711/161 |
| 2008/0117682 A1 | 5/2008 | Byeon | |
| 2008/0155301 A1 | 6/2008 | Ahvenainen et al. | |
| 2008/0209109 A1* | 8/2008 | Lasser | G06F 12/0804 711/103 |
| 2008/0270811 A1 | 10/2008 | Chow et al. | |
| 2008/0304351 A1 | 12/2008 | Lim et al. | |
| 2008/0307165 A1 | 12/2008 | Kazuhiro | |
| 2008/0320214 A1 | 12/2008 | Ma et al. | |
| 2009/0024778 A1 | 1/2009 | Morita | |
| 2009/0044190 A1 | 2/2009 | Tringali et al. | |
| 2009/0157974 A1 | 6/2009 | Lasser | |
| 2009/0232250 A1 | 9/2009 | Yamada et al. | |
| 2009/0235025 A1 | 9/2009 | Kondo | |
| 2009/0265514 A1 | 10/2009 | Biles et al. | |
| 2009/0315600 A1 | 12/2009 | Becker et al. | |
| 2010/0001762 A1 | 1/2010 | Kim | |
| 2010/0013675 A1 | 1/2010 | Bennett | |
| 2010/0023675 A1 | 1/2010 | Chen et al. | |
| 2010/0124090 A1 | 5/2010 | Arai | |
| 2010/0124102 A1 | 5/2010 | Lee et al. | |
| 2010/0161880 A1 | 6/2010 | You | |
| 2010/0161932 A1 | 6/2010 | Stern et al. | |
| 2010/0165769 A1 | 7/2010 | Kuroki | |
| 2010/0165780 A1 | 7/2010 | Bains et al. | |
| 2010/0172179 A1 | 7/2010 | Gorobets et al. | |
| 2010/0174955 A1 | 7/2010 | Carnevale et al. | |
| 2010/0195429 A1 | 8/2010 | Sonoda | |
| 2010/0254198 A1 | 10/2010 | Bringivijayaraghavan et al. | |
| 2010/0269115 A1 | 10/2010 | Arimilli et al. | |
| 2010/0293343 A1 | 11/2010 | Perego | |
| 2011/0035536 A1 | 2/2011 | Shim et al. | |
| 2011/0047319 A1 | 2/2011 | Jeon et al. | |
| 2011/0055453 A1 | 3/2011 | Bennett | |
| 2011/0055671 A1 | 3/2011 | Kim et al. | |
| 2011/0072190 A1 | 3/2011 | Borracini et al. | |
| 2011/0153900 A1 | 6/2011 | Zitlaw | |
| 2011/0170354 A1 | 7/2011 | DeCaro et al. | |
| 2011/0197014 A1 | 8/2011 | Yeh | |
| 2011/0228625 A1 | 9/2011 | Bringivijayaraghavan et al. | |
| 2011/0238866 A1 | 9/2011 | Zitlaw | |
| 2011/0238941 A1 | 9/2011 | Xu et al. | |
| 2011/0289255 A1 | 11/2011 | Wang et al. | |
| 2011/0314324 A1 | 12/2011 | Ozdemir | |
| 2012/0017053 A1 | 1/2012 | Yang et al. | |
| 2012/0054419 A1 | 3/2012 | Chen et al. | |
| 2012/0066434 A1 | 3/2012 | Zitlaw | |
| 2012/0117303 A1 | 5/2012 | Carannante et al. | |
| 2012/0124317 A1 | 5/2012 | Mirichigni et al. | |
| 2012/0131263 A1 | 5/2012 | Yeh | |
| 2012/0131304 A1 | 5/2012 | Franceschini et al. | |
| 2012/0173809 A1 | 7/2012 | Ko et al. | |
| 2012/0179860 A1 | 7/2012 | Falanga et al. | |
| 2012/0216085 A1 | 8/2012 | Weingarten et al. | |
| 2012/0254873 A1 | 10/2012 | Bringivijayaraghavan | |
| 2012/0265922 A1 | 10/2012 | Post et al. | |
| 2012/0269015 A1 | 10/2012 | Bringivijayaraghavan | |
| 2012/0324141 A1 | 12/2012 | Seong et al. | |
| 2012/0331207 A1 | 12/2012 | Lassa et al. | |
| 2013/0036253 A1 | 2/2013 | Baltar | |
| 2013/0058175 A1 | 3/2013 | Lin et al. | |
| 2013/0159766 A1 | 6/2013 | D'Abreu et al. | |
| 2013/0191601 A1* | 7/2013 | Peterson | G06F 12/0868 711/137 |
| 2013/0191704 A1 | 7/2013 | Eleftheriou et al. | |
| 2013/0194013 A1 | 8/2013 | Kwak | |
| 2013/0250701 A1 | 9/2013 | Bringivijayaraghavan et al. | |
| 2013/0262746 A1 | 10/2013 | Srinivasan | |
| 2013/0282967 A1 | 10/2013 | Ramanujan | |
| 2013/0321052 A1 | 12/2013 | Huber et al. | |
| 2013/0329503 A1 | 12/2013 | Bringivijayaraghavan | |
| 2013/0342254 A1 | 12/2013 | Mazumder et al. | |
| 2014/0010025 A1 | 1/2014 | Bringivijayaraghavan | |
| 2014/0013028 A1 | 1/2014 | Rametta | |
| 2014/0035640 A1 | 2/2014 | Kwak et al. | |
| 2014/0055184 A1 | 2/2014 | Vankayala | |
| 2014/0082259 A1 | 3/2014 | Yeh | |
| 2014/0089562 A1 | 3/2014 | Deguchi et al. | |
| 2014/0122814 A1 | 5/2014 | Mirichigni et al. | |
| 2014/0122822 A1 | 5/2014 | Mirichigni et al. | |
| 2014/0136771 A1 | 5/2014 | Cornwell et al. | |
| 2014/0215129 A1 | 7/2014 | Kuzmin et al. | |
| 2014/0281182 A1 | 9/2014 | Mirichigni et al. | |
| 2015/0052288 A1 | 2/2015 | Mincnigni et al. | |
| 2015/0052299 A1 | 2/2015 | Mirichigni et al. | |
| 2015/0095551 A1 | 4/2015 | Confalonieri et al. | |
| 2015/0100744 A1 | 4/2015 | Mirichigni | |
| 2015/0347038 A1 | 12/2015 | Monteleone et al. | |
| 2017/0083263 A1 | 3/2017 | Mirichigni et al. | |
| 2017/0147234 A1 | 5/2017 | Frans et al. | |
| 2017/0300413 A1 | 10/2017 | Mirichigni et al. | |
| 2017/0308382 A1 | 10/2017 | Mirichigni et al. | |
| 2017/0309318 A1 | 10/2017 | Mirichigni et al. | |
| 2017/0329534 A1 | 11/2017 | Mirichigni et al. | |
| 2018/0121356 A1 | 5/2018 | Mirichigni et al. | |
| 2018/0349302 A1 | 12/2018 | Mirichigni et al. | |
| 2019/0080733 A1 | 3/2019 | Mirichigni et al. | |

FOREIGN PATENT DOCUMENTS

| | | |
|---|---|---|
| CN | 101256539 A | 9/2008 |
| CN | 101752009 A | 6/2010 |
| CN | 101820450 A | 9/2010 |
| CN | 1860460 A | 1/2011 |
| JP | 2005108395 A | 4/2005 |
| JP | 2009025866 A | 2/2009 |
| JP | 2011503753 A | 1/2011 |
| JP | 2013524388 A | 6/2013 |
| TW | 201303735 | 1/2013 |
| WO | 2011130547 A1 | 10/2011 |
| WO | 2014149831 A1 | 9/2014 |
| WO | 2015183443 A1 | 12/2015 |

OTHER PUBLICATIONS

U.S. Appl. No. 15/643,361, entitled "Apparatuses and Methods for Memory Operations Having Variable Latencies", filed Jul. 6, 2017; pp. all.
U.S. Appl. No. 15/667,358, entitled "Apparatuses and Methods for Variable Latency Memory Operations", filed Aug. 2, 2017; pp. all.
U.S. Appl. No. 15/857,435, entitled "Apparatuses and Methods for Providing Data to a Configurable Storage Area", filed Dec. 28, 2017; pp. all.
U.S. Appl. No. 16/105,846 titled "Apparatuses and Methods for Memory Operations Having Variable Latencies" filed Aug. 20, 2018; pp. all.
U.S. Appl. No. 16/058,793 titled "Apparatuses and Methods for Variable Latency Memory Operations" filed Aug. 8, 2018; pp. all.
Definition from Wiktionary, the free dictionary—Archived revision by Tuvalkin (talk | contribs) as of 21:49, Jan. 5, 2012. https://en.wiktionary.org/w/index/php?title=available&oldid=15765189 Downloaded Jan. 13, 2016.
U.S. Appl. No. 16/898,865 titled "Apparatuses and Methods for Memory Operations Having Variable Latencies" filed Nov. 13, 2018, pp. all.
"Interfacing DDR SDRAM with Stratix II Devices", Version 3.2, Altera Corp, Sep. 2008, pp. all.
"JEDEC—Low Power Double Data Rate 2 (LPDDR2)", Feb. 2010, pp. all.
Handy, J. "The Cache Memory Book Second Edition", Academic Press Prof., Inc., San Diego, CA, Jan. 1993, p. 67.
Lee "How to Implement DDR SGRAM in Graphic System" Samsung Electric, 4Q1998 (Oct.-Dec. 1998).
Qureshi, et al., "Enhancing Lifetime and Security of PCM-Based Main Memory with Start-Gap Wearing Leveling", Microarchitecture, 2009 42nd Annual IEEE/ACM International Symposium, Dec. 12-16, 2009, pp. 14-23.

\* cited by examiner

| ADDRESS 302 | DATA 304 | DATA FLAG 306 | USAGE FLAG 308 | AGE 310 |

| Parameter | Binary Value | Description |
|---|---|---|
| Storage Area Offset | 0000 | 0/16 |
| | 0001 | 1/16 |
| | 0010 | 2/16 |
| | ... | ... |
| | 1111 | 15/16 |

| Parameter | Binary Value | Description |
|---|---|---|
| Storage Area Size | 0000 | 16/16 |
| | 0001 | 1/16 |
| | 0010 | 2/16 |
| | ... | ... |
| | 1111 | 15/16 |

FIG. 5

APPARATUSES AND METHODS FOR PROVIDING DATA TO A CONFIGURABLE STORAGE AREA

CROSS-REFERENCED TO RELATED APPLICATION(S)

This application is a continuation of U.S. patent application Ser. No. 15/857,435 filed Dec. 28, 2017, issued as U.S. Pat. No. 10,223,263 on March 5. 2019, which is a continuation of U.S. patent application Ser. No. 15/637,961, filed Jun. 29, 2017, issued as U.S. Pat. No. 9,928,171 on Mar. 27, 2018, which is a continuation of U.S. patent application Ser. No. 13/967,206, filed Aug. 14, 2013, issued as U.S. Pat. No. 9,727,493 on Aug. 8, 2017. These applications and patents are incorporated by reference herein, in their entirety, and for all purposes.

TECHNICAL FIELD

Embodiments of the present invention relate generally to memories, and more specifically, in one or more described embodiments, to providing data from a buffer.

BACKGROUND

Memories may be included in a variety of apparatuses, such as computers or other devices, including but not limited to portable memory devices, solid state drives, personal digital assistants, music players, cameras, phones, wireless devices, displays, chip sets, set top boxes, gaming systems, vehicles, and appliances. There are many different types of memory including random-access memory (RAM), read only memory (ROM), dynamic random access memory (DRAM), synchronous dynamic random access memory (SDRAM), flash memory, and resistance variable memory, among others.

Memories, such as resistance variable memory devices, may be used as non-volatile memory for a wide range of electronic devices. Resistance variable memory devices may include, for example, phase change memory (PCM) or resistive memory, among others.

In some instances, it may be desirable to use PCM to implement random access memory. However, implementation in this manner is not seamless as read operations cannot be performed at a memory location undergoing a write operation and write operations may be relatively slower than write operations of conventional RAM. For example, PCMs may require additional time to manage and complete write operations, such as preparing data to be written to memory, suspending a write operation for a read access request, and monitoring progress of a write operation.

As a result of the limitations of using PCM as RAM replacement, operation of PCMs in memory systems may be restricted and/or require additional mechanisms for operation. For example, write and read operations may not be performed at any time on any memory location, and as a result, status registers most be regularly queried to determine whether a particular write operation has completed before another write operation is performed. Additionally, in some applications write operations are necessarily suspended for read operations and resumed upon completion of the read operation.

BRIEF DESCRIPTION OF THE DRAWINGS

FIG. 3 is a block diagram of a cache line according to an embodiment of the present invention.

FIG. 4 is a table illustrating example storage area offsets according to an embodiment of the present invention.

FIG. 5 is a table illustrating example storage area sizes according to an embodiment of the present invention.

DETAILED DESCRIPTION

Apparatuses and methods for providing data to a configurable storage area are disclosed herein. Certain details are set forth below to provide a sufficient understanding of embodiments of the invention. However, it will be clear to one having skill in the art that embodiments of the invention may be practiced without these particular details. Moreover, the particular embodiments of the present invention described herein are provided by way of example and should not be used to limit the scope of the invention to these particular embodiments. In other instances, well-known circuits, control signals, timing protocols, and software operations have not been shown in detail in order to avoid unnecessarily obscuring the invention.

Embodiments described herein are directed generally to memory and storing data therein. For example, reference is made to storing data and is intended to include both write operations for storing data in volatile memories and programming operations for storing data in non-volatile memories. Moreover, while reference is made herein to write data, write data is intended to include any data provided to a memory for storing in one or more of volatile and non-volatile memory.

Figure 1:
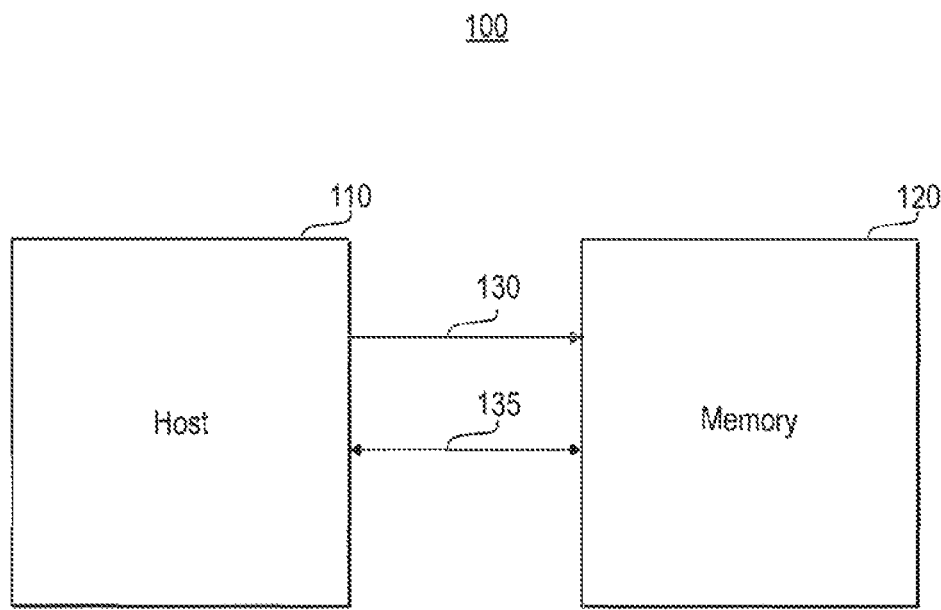
FIG. 1 is a block diagram of an apparatus according to an embodiment of the present invention.

FIG. 1 is a block diagram of an apparatus 100 according to as embodiment of the present invention. The apparatus may comprise circuitry, one or more semiconductor dice, a packaged semiconductor, a device including such circuitry, die, or package, and/or a system including such a device. The apparatus 100 may include a host 110 (e.g., memory controller) and a memory 120. The host 110 and the memory 120 may be coupled by a command and address (CA) bus 130 and a data bus 135. The memory 120 may be configured to receive commands and/or addresses from the host 110 over the CA bus 130, and the memory may be configured to receive data and/or provide data over the data bus 135. Although description is made herein with respect to the host 110 and memory 120 providing signals over the CA bus 130 and the data bus 135, in some examples, a single bus may be used to provide signals. For example, in at least one embodiment, the host 110 may be configured to provide commands, addresses, and data to the memory 120 and receive data from the memory 120, over a single, shared bus.

The memory 120 may be configured to perform operations (e.g., read operations, write operations, or flush operations) in response to received commands and/or addresses that are provided by the host 110. For example, the memory 120 may provide data to the host 110 over the data bus 135 responsive to a read command, and may store data received over the data bus 135 responsive to a write command. The memory 120 may internally provide data stored in a buffer to a storage area responsive to a flush command. Additionally, the memory 120 may further provide information to the host 110 over the data bits 135 in response to particular commands. The information may indicate, for instance, whether the memory 120 is available to perform a memory operation and/or an amount of time before the memory 120 may become available to perform a memory operation.

By way of example, the information provided by the memory 120 may include information related to a memory operation performed in response to a command, remaining time of a variable latency period tLAT following receipt of a command, an acknowledgement ACK indicating an end of a variable latency period tLAT, as well as other information that may be related to the memory 120. By way of example, the memory 120 may indicate it is busy performing an operation or may indicate it is available to perform an operation. In some examples, the memory 120 may indicate an amount of time needed before the memory 120 will become available to perform a memory command.

During the tLAT period, the memory 120 may manage memory operations. For example, during the tLAT period the memory 120 may prepare itself for an operation (e.g., by preparing memory circuits for performing an operation), complete a memory operation in progress, suspend an operation in progress to begin performing a new operation, or manage other operations. As such, the duration of the variable latency period tLAT may vary. In some embodiments, the memory 120 may provide information related to the time for the tLAT period. The memory 120 may, for instance, provide a remaining duration for the tLAT period.

In some embodiments, the memory 120 may be configured such that the tLAT period is guaranteed to end within one or more particular amounts of time. For example, in at least one embodiment, when a command comprises a read command, the memory 120 may be configured such that the tLAT period ends whhin a time tMAXLATR. When a command comprises a write command, the memory 130 may be confirmed the tLAT period will end within tMAXLATW. Values for both tMAXLATR and tMAXLATW may be stored as parameters in a register (not shown in FIG. 1), and in some instances, may be predetermined and/or equal or unequal. The values for tMAXLATR and tMAXLATW may be adjusted in real-time, for instance, based on priority of commands. By way of example, tMAXLATW may be increased when read commands are prioritized over write commands.

Figure 2:
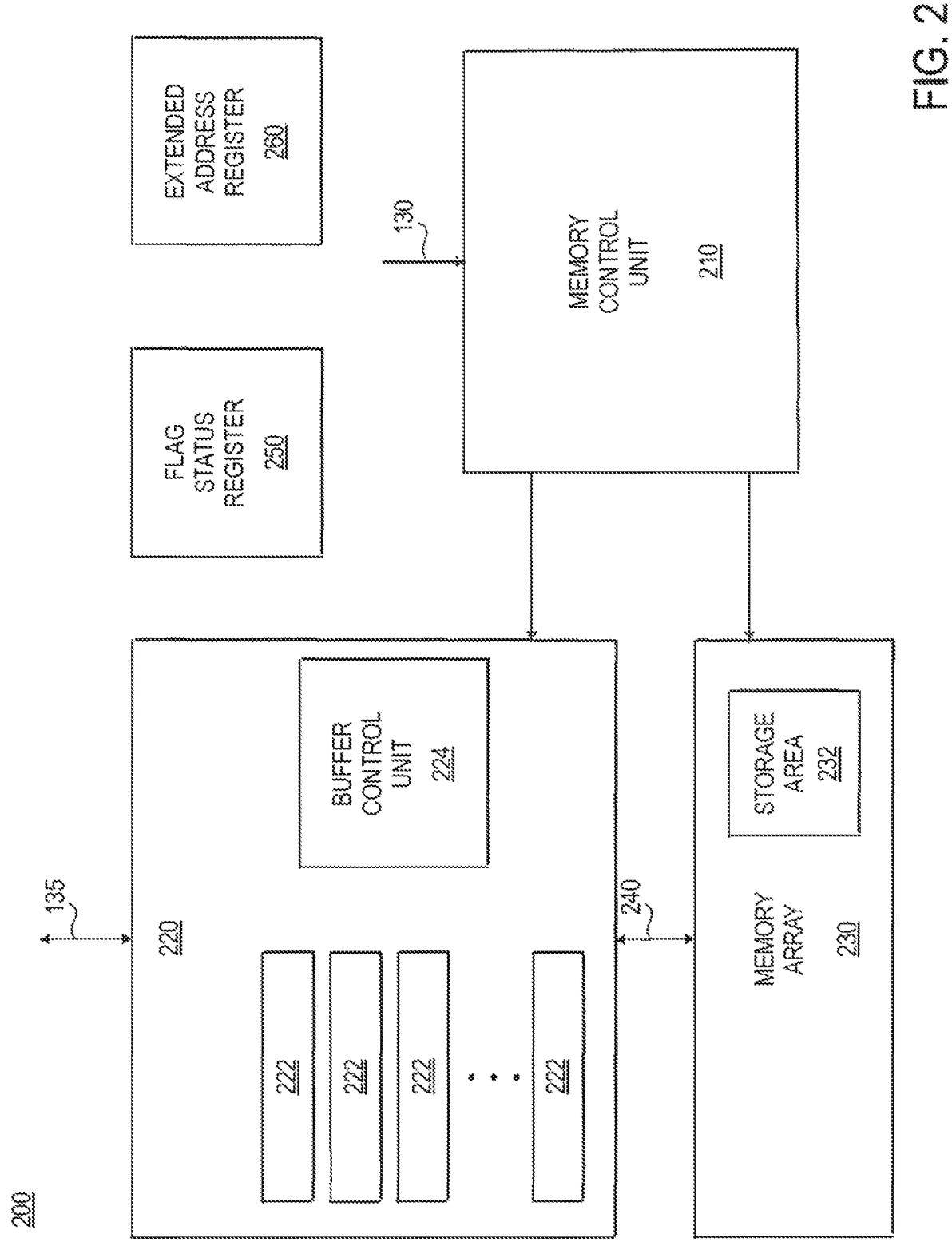
FIG. 2 is a block diagram of a memory according to an embodiment of the present invention.

FIG. 2 is a block diagram of a memory 200 according to an embodiment of the present invention. The memory 200 may be used to implement, at least in part, the memory 120 of FIG. 1. The memory 200 may include a memory control unit 210, a buffer 220, and an array 230. The memory 200 may include elements that have been previously described with respect to the apparatus 100 of FIG. 1. Those elements have been identified in FIG. 2 using the same reference numbers used in FIG. 1 and operation of the common elements is as previously described. Consequently, a detailed description of the operation of these elements will not be repeated in the interest of brevity.

The memory control unit 210 may be coupled to the buffer 220 and the array 230 and may be configured to control operation of the buffer 220 and the array 230. The memory control unit 210 may be configured to receive commands and addresses from the CA bus 130 and the buffer 220 may be configured to receive data from the data bus 135 and provide data to the data bus 135. The memory control unit 210 may be configured to cause data (e.g., write data or read data) to be provided between the buffer 220 and the array 230 over the data bus 240 in response to received commands and addresses. For example, in response to a write command, the memory control unit 210 may cause write data to be provided from the buffer 220 to the array 230. Similarly, in response to a read command, the memory control unit 210 may cause read data to be provided from the array 230 to the buffer 220. Responsive to a flush command, the memory control unit 210 may cause write data to be provided from the buffer 220 to a storage area of the array 230, for example, a storage area 232 configured to provide persistent storage.

The buffer 220 may include a phiialiiy of cache lines 222, each of which may comprise volatile memory (e.g., registers) and may be configured to store data received by the buffer 220 on one or more of the data busses 135, 240. Each of the plurality of cache lines 222 may further be configured to srore an address and/or information associated with the data.

By way of example, with reference to FIG. 3, a cache line 300 according to an embodiment of the invention may be used to implement one or more of the cache lines 222 of FIG. 2. The cache line 300 may include a plurality of fields in which respective addresses, data and/or information associated with the data may be stored. The cache line 300 may, for instance, include an address field 302, a data field 304, a data flag field 306, a usage field 308, and an age field 310. The address field 302 and the data field 304 may include an address (e.g., row address) and data associated with the address respectively. For example, the data may comprise read data received from tire array 230 (e.g., in response to a read command) and the address may comprise the address at which the data is stored in the array 230, or the data may comprise write data received for storing in the array 230 (e.g., in response to a write command) and the address may comprise the address at which the data is to be stored. The address included in the address field 302 may be a memory address or information related to a memory address. The data flag field 306 may include information (e.g., flag bits) indicating whether the data stored is the cache line 300 has been modified since the cache line 300 was associated with a particular address. In some examples, the data flag field 306 may include 1 flag bit for each byte of data stored, and in this manner, the data flag field 306 may indicate which portions of data stored in a data field 304 have been modified. The usage field 308 may include information indicating whether the cache line 300 is in use. For example, a cache line 300 may be in use when the data comprises write data not yet stored in the array 230. In some examples, the usage field 308 may further indicate whether the data comprises write data to be stored in a storage area 232 of the array 230, as described in more detail below. The age field 310 may include information indicating how long the data has been stored in the data field 304 of the cache line 300. Information stored in the age field 310 may indicate, for example, a duration of time, a number of operations (e.g., transparent write operations), a number of clock cycles, or a combination thereof.

Referring once again to FIG. 2, the buffet 220 further include a buffer control unit 224 that may be configured to control operation of the buffet 220. The buffet control unit 224 may be configured to select a cache line 222 for storing data received by the buffer 220, for instance, during a write operation, and/or may be configured to update one or more fields of a cache line 222. The buffer control unit 224 may further be configured to provide data from the buffer 220 during respective operations. During a read operation, for example, the buffer control unit 224 may provide data from a cache line 222 to the data bus 135. As will be explained in more detail below, during a flush command, the buffer control unit 224 may provide data from one or more cache lines 222 to the array 230. In some examples, the buffer control unit 224 may be configured to provide data from the buffer 220 response, at least in part, to one or more control signals provided by the memory control unit 210.

The array 230 may comprise any array known in the art, now or in the future, and may include volatile memory cells, non-volatile memory cells (e.g., PCM memory cells), or a combination thereof.

In some instances, a memory, such as the memory 200 of FIG. 2, may be configured to provide data from one or more cache lines 222 to the array 230 responsive, at least in part, to a command. Accordingly, a host such as the host 110 of FIG. 1, may be configured to provide a flush command to the memory control unit 210 of the memory 200, and in response, the memory control unit 210 may cause the buffer control unit 224 to perform a flush operation. A flush operation may comprise providing write data from one or more of the cache lines 222 to the memory 230.

Additionaly, in at least one embodiment, the array 230 may comprise a storage area 232 configured to provide persistent storage of data. The storage area 232 may include non-volatile memory. The memory 200 may include a register, such as the extended address register 260 of FIG. 2, that may be configured to store a plurality of configuration bits that define the partition (e.g., size and/or offset relative to an address) of the storage area 232 within the array 230.

With reference to FIG. 4, table 400 illustrates example storage area offsets according to an embodiment of the invention. As shown, a set of the configuration bits of the extended address register 260 may be assigned a particular binary value, thereby determining the offset of the storage area 232 within the array 230. In one embodiment, the configuration bits may be configured to indicate an offset relative to the size of the array 230. For example, a binary value of '0001' may indicate an offset of the storage area 232 of one-sixteenth of the size of the array 230. Additionally or alternatively, respective binary values may indicate an offset using a specific row address (e.g., the row address at which the storage area 232 begins or the row address at which the storage area 232 ends).

With reference to FIG. 5, table 500 illustrates example storage area sizes according to an embodiment of the invention. As shown, a set of the configuration hits of the extended address register 260 may be assigned a particular binary value, thereby determining the size of the storage area 232. In one embodiment, the configuration bits may be configured to indicate a size based on the size of the array 230. For example, a binary value of '0000' may indicate that the storage area 232 comprises the entire array 230. In another example, a binary value of '0010' may indicate a size of one-eighth of the size of the array 230. Additionally or alternatively, respective binary values may indicate a size for the storage area 232 using, for instance, in bytes, blocks, and/or row address ranges.

In at least one embodiment, the memory control unit 210 may be configured to update the configuration bits to increase or decrease the size of the storage area 232 and/or adjust the offset of the storage area 232 relative to a particular location in the array 230. The memory control unit 210 may be configured to update the configuration bits, for instance, in response to a command (e.g., resize command) provided by the host 110.

Referring hack to FIG. 2, in some instances, the memory control unit 210 may be configured to identify write data intended for storing in the storage area 232. For example, the memory control unit 210 may identify write data intended for storing in the storage area 232 based, at least in part, on an address associated with the write data (e.g., whether the address comprises an address located in the storage area 232). In another example, the memory control unit 210 may identify write data intended for storing in the storage area 232, for instance, based, at least in part, on a usage flag 308 associated with the write data.

If the memory control unit 210 identifies write data intended for storing in the storage area 232, the memory control unit 210 my set a flush bit of a register, such as the flag status register 250 of FIG. 2, to a first state to indicate that one or more cache lines 222 include data intended to be stored in the storage area 232 of the array 230.

In response to a flush command, provided, for instance by the host 110, the memory control unit 210 may be configured to cause the buffer control unit 224 to provide write data from all cache lines 222 in use or may be configured to provide write data from fewer than all cache lines 222 in use. For example, write data may be provided from only from cache lines 222 in use storing write data intended to be stored in the storage area 232. In another example, write data may be first provided from cache lines 222 in use storing write data intended to be stored in the storage area 232 and subsequently provided from all other from cache lines 222 in use. Once all write data intended to be stored in the storage area 232 has been provided from the buffer 220 to the storage area 232, for instance, in response to a flush command, the memory control unit 210 may set the flush bit of the flag status register 250 to a second state, thereby indicating that none of the cache lines 222 include write data intended to be stored in the storage area 232 not yet stored in the array 230.

As described, the memory 230 may include a storage area 232 that may comprise non-volatile memory. Thus, by providing a flush command to the memory 230, the host 110 may assure that particular data (e.g., write data associated, with an address located in the storage area 232) is maintained in persistent memory. Other data, such as data not intended to be maintained as persistent, may be stored in other portions of the array 230. In some examples, the other portions of the array 230 may comprise non-volatile memory, volatile memory, or a combination thereof. As described, the memory 200 may be configured to provide information to the host 110 in response to particular commands. In some examples, a host, such as the host 110 of FIG. 1, may be configured to provide a read flag status register (RFSR) command, and in response, the memory control unit 210 may provide the state of the flush bit of the flag status register 250 to the host 110. In at least one embodiment, the memory control unit 210 may cause the buffer control unit 224 to proxide the state of the flush bit to the host 110 using the data bus 135. Based, at least in part, on the state of the flush bit, the host 110 may provide a flush command to the memory control unit 210. For example, after providing a flush command to the memory 200, the host 110 may provide one or more RFSR commands to determine (e.g., periodically determine) the state of the flush bit. In this manner, the host 110 may monitor progress of a flush operation to ensure that data is properly provided to the array 230, as described.

Moreover, the memory 200 may be configured to guarantee that a variable latency period tLAT will end within a particular time tLATMAXR and tLATMAXW for read and write commands, respectively. Accordingly, if the memory 200 is performing a flush operation during the period tLAT, in some instances, the memory 200 may need to interrupt the flush command and prepare itself to perform the respective read command or write command. In at least one embodiment, once the read or write command is performed, the memory 200 may resume the flush command. In other embodiments, the memory 200 may require that the host 110 subsequently provide a new flush command.

As described, one or more of the cache lines 222 may store write data received by the buffer 220 from the data bus 135. Because the write data is first stored in a cache line 222, a usage field of the cache line 222 may include information indicating that the cache line is in use, e.g., storing write data, that has not yet been stored in the array 230. In some instances, it may be desirable to delay providing write data from a cache line 222 to the array 230 such that other operations may be performed before the write data is provided. However, as a result, during operation of the buffer 220, the number of cache lines 222 not in use may decrease. Accordingly, the buffer control unit 224 may be configured to perform a transfer operation when a threshold has been met. The threshold may comprise, for instance, a particular number of cache lines 222 being in use. By way of example, in performing a transfer operation, the buffer control unit 224 may provide data from a first number of cache lines 222 (e.g., M cache lines 222) to the array 230 in response to a second number of cache lines (e.g., N cache lines 222) being in use. In some examples, M and N may comprise a same number of cache lines 222 or may comprise a different number of cache lines 222. Once the transfer operation is complete, those cache lines 222 having data provided to the array 230 during the transfer operation may be considered to not be in use, and the buffer control unit 224 may update the information in a usage field (e.g., usage field 308) of these cache tines 222 accordingly. Subsequently, those cache lines 222 may be reused, such as to store read data and/or store write data in accordance with embodiments described herein.

In some examples, the sequence in which write data stored in cache lines 222 is provided during a transfer operation may be based, at least in part, on information in one or more fields of the cache lines 222. In at least one embodiment, the buffer control unit 224 may be configured to prioritize write data of respective cache lines 222 based, at least in part on the age field 310. The buffer control unit 224 may, for instance, be configured to first provide data from a cache line 222 having stored write data that has been stored in the buffer 220 for the longest duration as indicated by information in respective age fields 310.

In some examples, the memory control unit 210 and/or the buffer control unit 224 may be configured to prioritize internal memory operations, such as transfer operations. Accordingly, based on pending Internal memory operations, the time at which a transfer operation is performed may be adjusted (e.g., hastened or delayed) based, at least in part, on the respective priority of the transfer operation.

Figure 6:
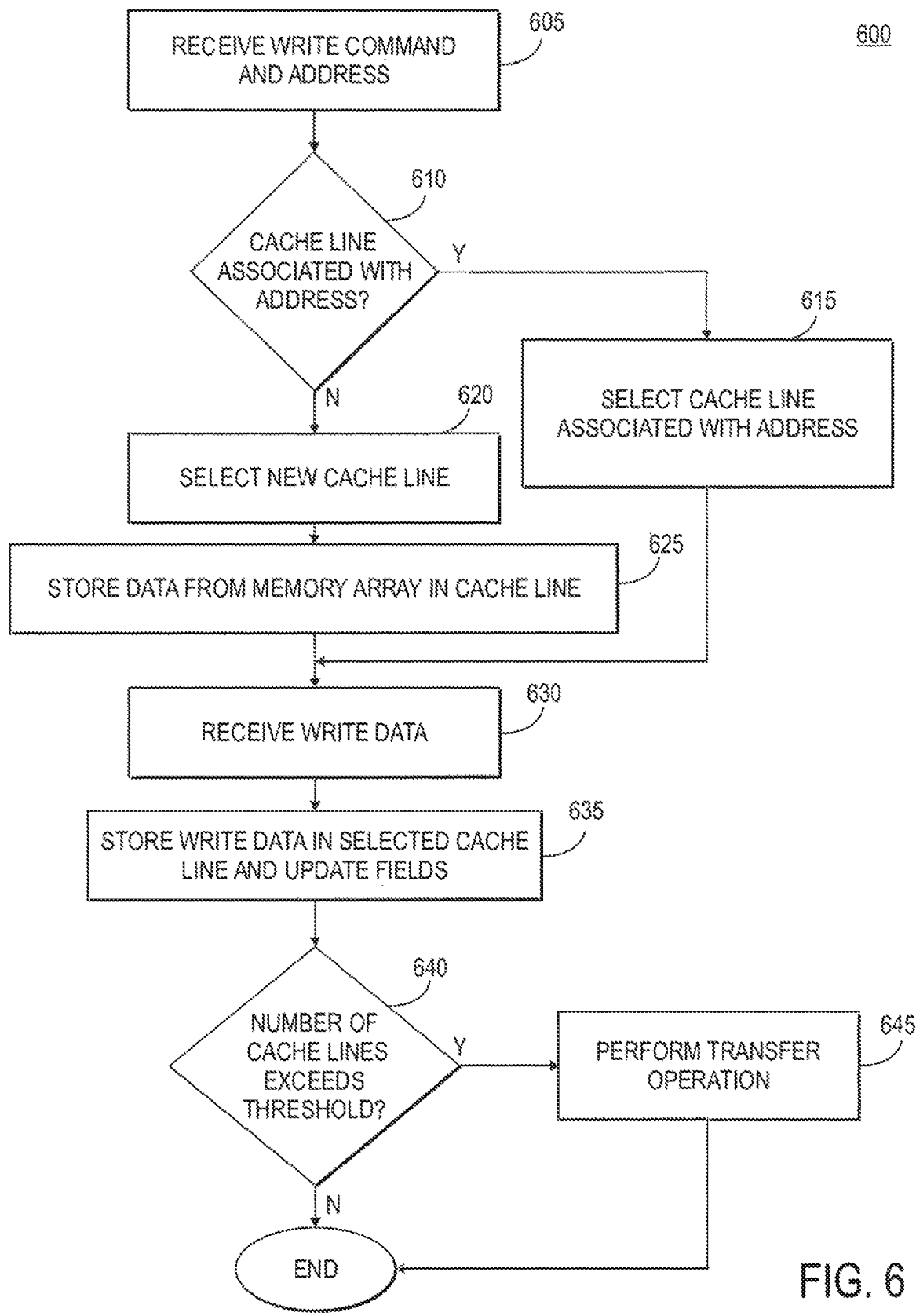
FIG. 6 is a flowchart of a method for performing a write operation according to an embodiment of the present invention.

FIG. 6 is a flowchart, of a method 600 for performing a write operation according to an embodiment of the present invention. The method may be implemented using, for instance, the memory 200 of FIG. 2. At step 605, the memory control, unit 210 may receive a write command and an address on the CA bus 130, for instance, from the host 110. The memory control unit 210 may provide the address to the buffer 220, and in particular, to the buffer control unit 224. At step 610, the buffer control unit 224 may determine whether a cache line 222 of the buffer 220 is associated with the address. For example, the buffer control unit 224 may determine whether an address stored in an address field 302 of a cache line 222 matches the address received from the memory control unit 210. If a cache line 222 is associated with the address, the buffer control unit 224 may select the associated cache line 222 at step 615.

If no cache line 222 is associated with the address as step 620 the buffer control unit 224 may select a new cache line 222. The buffer control unit 224 may select, for instance, any cache line 222 not in use, and further may store the address reveled from the memory control unit 210 in the address field 302 of the selected cache line 222. At step 625, the memory control unit 210 may cause data stored at the address of the array 230 to be provided to the buffer 220, and the buffer 220 may store the data in the selected cache line 222.

At step 630, the buffer 220 may receive write data from the data bus 135. At step 635, the write data may be stored in the selected cache line 222. The buffer control unit 224 may also update fields of the selected cache line 222. For example, the buffer control unit 224 may update the data flag field 306 to indicate which, if any, of the data stored in the selected cache line 222 has been modified as a result of storing the write data. The buffer control unit 224 further may update the usage field 308 to indicate that the cache line 222 is in use and includes write data not yet stored in the array 230.

As described, the buffer control unit 224 may be configured to provide data from one or more cache lines 222 responsive, at least in part, to a threshold being met. Accordingly, at step 640, the buffer control unit 224 may determine the number of cache lines 222 in use. If the number does not exceed a threshold, the write operation ends. If the number satisfies the threshold, the buffer control unit 224 may perform a transfer operation. As described, this may cause write data not yet stored in the array 230 to be provided from one or more cache lines 222 to the array 230. For each cache line 222 having respective write data provided to the array 230 in this manner, the buffer control unit 224 further may update the usage field 308 to indicate that each of these cache lines 222 is no longer in use.

Figure 7:
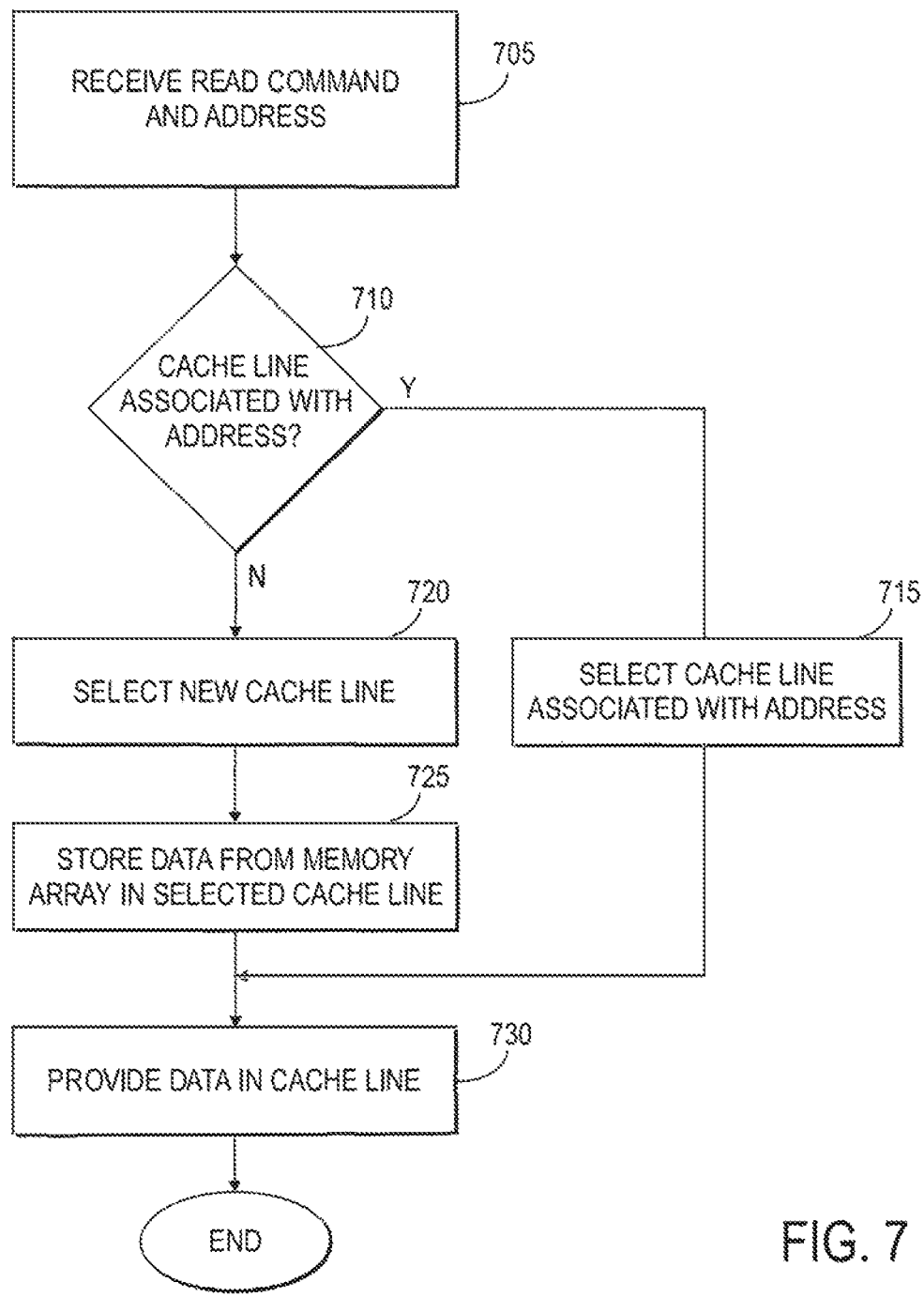
FIG. 7 is a flowchart of a method for performing a read operation according to an embodiment of the present invention.

FIG. 7 is a flowchart of a method 700 for performing a read operation according to an embodiment of the present invention. The method may be implemented, for instance, using the memory 200 of FIG. 2. At step 705, the memory control unit 210 may receive a read command and an address on the CA bus 130. The memory control unit 210 may provide the address to the buffer 220, and in particular, to the buffer control unit 224. At step 710, the buffer control unit 224 may determine whether a cache line 222 of the buffer 220 is associated with the address. For example, the buffer control unit 224 may determine whether an address stored in an address field 302 of a cache line 222 matches the address received from the memory control unit 210. If a cache line 222 is associated with the address, the buffer control unit 224 may select the associated cache line 222 at step 715.

If no cache line 222 is associated with the address, at step 720 the buffer control unit 224 may select a new cache line 222. The buffer control unit 224 may select, for instance, any cache line 222 not in use and may store the address received from the memory control unit 210 in the address field 302 of the selected cache line 222. At step 725, the memory control unit 210 may cause data stored at the address of the array 230 to be provided to the buffer 220, and the buffer 220 may store the data in the selected cache line 222. At step 730, the data stored in the selected cache line 122 may be provided to the data bus 135.

From the foregoing it will be appreciated that, although specific embodiment of the invention have been described herein for purposes of illustration, various modifications may be made without deviating from the spirit and scope of the invention. Accordingly, the invention is not limited except as by the appended claims.

What is claimed is:

1. An apparatus, comprising:
   an array having a storage area;
   a register configured to store at least one bit;
   a buffer configured to store data; and
   a memory control circuit configured to control the storage area of the array to store the data stored in the buffer based on the at least one bit stored in the register in response to a flush command, the memory control circuit further configured to,
   responsive to a latency period for a read command or a write command, interrupt the flush command.

2. The apparatus of claim 1, wherein the at least one bit defines a partition of the array as the storage area.

3. The apparatus of claim 1, wherein the at least one bit indicates an offset for the storage area relative to a size of the array.

4. The apparatus of claim 1, wherein the at least one bit defines a partition of the array as the storage area by a size and/or offset of the storage area relative to an address of the storage area.

5. The apparatus of claim 1, wherein the memory control circuit is further configured to receive a command among a plurality of commands,
   wherein the received command is a flush command, the plurality of commands include at least one other command, and
   wherein the memory control circuit is further configured to interrupt the flush command to prepare for the at least one other command.

6. The apparatus of claim 1, wherein the array comprises non-volatile memory.

7. The apparatus of claim 1, wherein the memory control circuit is further configured to access one of a random access memory and a read only memory.

8. An apparatus, comprising:
   an array;
   a register configured to store at least one bit; and
   a control circuit configured to:
   control a partition of the array to receive data and store the received data,
   control the partition of the array to store the received data responsive to a flush command, and
   responsive to a latency period for a read command or a write command, interrupt the flush command.

9. The apparatus of claim 8, further comprising a buffer configured to store and provide the data to the partition of the array,
   wherein the partition of the array is defined based on the at least one bit stored in the register.

10. The apparatus of claim 9, wherein the at least one bit defines the partition of the array as a storage area by a size and/or offset of the storage area relative to an address of the storage area.

11. The apparatus of claim 8, wherein the array comprises non-volatile memory.

12. The apparatus of claim 8, wherein the control circuit is further configured to access one of a random access memory and a read only memory.

13. A wireless device, comprising:
   a storage area;
   a register configured to store at least one bit;
   a buffer configured to store data; and
   a control circuit configured to control the storage area to receive and store the data based on the at least one bit and in response to a flush command, and further configured to interrupt the flush command responsive to a latency period for a read command or a write command.

14. The wireless device of claim 13, wherein the buffer includes a plurality of cache lines configured to store the data to be provided to, and stored in, the storage area.

15. The wireless device of claim 13, further comprising an array having the storage area,
   wherein the at least one bit indicates an offset for the storage area relative to a size of the array.

16. The wireless device of claim 13, wherein the control circuit is further configured to access one of a random access memory and a read only memory.

* * * * *